United States Patent
Roesch et al.

(10) Patent No.: US 6,950,542 B2
(45) Date of Patent: Sep. 27, 2005

(54) DEVICE AND METHOD OF COMPUTING A TRANSFORMATION LINKING TWO IMAGES

(75) Inventors: Peter Roesch, Hamburg (DE); Juergen Weese, Henstedt-Ulzburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 717 days.

(21) Appl. No.: 09/962,386

(22) Filed: Sep. 25, 2001

(65) Prior Publication Data

US 2002/0054699 A1 May 9, 2002

(30) Foreign Application Priority Data

Sep. 26, 2000 (DE) ........................................ 100 48 029

(51) Int. Cl.[7] .............................................. G06K 9/00
(52) U.S. Cl. ..................... 382/128; 382/131; 382/294
(58) Field of Search ........................ 382/128, 130–132, 382/276–296; 600/410, 425

(56) References Cited

U.S. PATENT DOCUMENTS

| | | | | |
|---|---|---|---|---|
| 5,672,877 A | * | 9/1997 | Liebig et al. | 250/363.04 |
| 6,402,707 B1 | * | 6/2002 | Ernst | 600/590 |
| 6,490,476 B1 | * | 12/2002 | Townsend et al. | 600/427 |
| 6,560,354 B1 | * | 5/2003 | Maurer et al. | 382/131 |

OTHER PUBLICATIONS

Hu, "Volumetric Rendering of Multimodality, Multivariable Medical imaging data", May 1989, Proceedings of the 1989 Chapel Hill workshop on Volume visualization.*

Hawke et al, "Voxel–Based 2–d/3–d Registration of Fluosocopy Images and CT Scans for image–Guided Surgery", Information Technology in Biomedicine, IEEE Transactions on, Vol:. 1 , Issue: 4 , Dec. 1997 pp:. 284–293.*

Little et al, "Deformation Incorporating Rigid Structures", Mathematical Methods in Biomedical Image Analysis, 1996., Proceedings of the Workshop on Jun. 21–22, 1996 pp:. 104–113.*

* cited by examiner

*Primary Examiner*—Jose L. Couso
*Assistant Examiner*—Tom Y. Lu

(57) ABSTRACT

The invention relates to a method of computing the transformation which transforms two different images (10, 10') of an object one into the other while describing the motion or deformation of the object. In accordance with the method first the local transformation parameters are computed for sub-regions (1, 2, 3, 4, 5). By choosing the sub-regions so as to be sufficiently small, a rigid transformation can be used for this purpose. Starting from at least one first predetermined sub-region (1), the local transformation parameters of the neighboring sub-regions (2, 3, 4, 5) are successively computed, the starting values on which each computation is based being the already determined local transformation parameters of neighboring sub-regions. Using the local transformation parameters thus determined for sub-regions, the overall transformation can subsequently be computed.

10 Claims, 3 Drawing Sheets

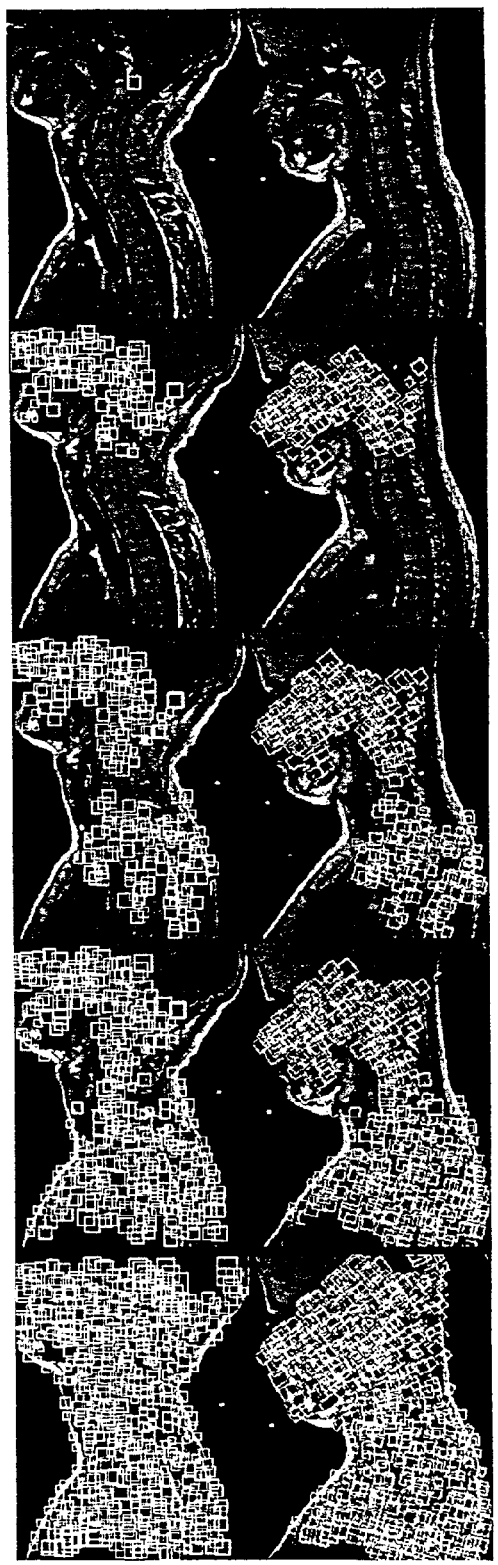
Fig.2

DEVICE AND METHOD OF COMPUTING A TRANSFORMATION LINKING TWO IMAGES

The invention relates to a method of computing the transformation which transforms two images of an object, preferably acquired by computed tomography or magnetic resonance tomography, one into the other, first the local transformation parameters being successively computed for sub-regions of the images and subsequently the overall transformation being computed therefrom. Moreover, the invention relates to a device adapted to perform said method.

In numerous medical and non-medical applications of imaging methods a problem is encountered in that two images formed of the same object have to be analyzed as regards which elements in the images correspond to one another and how these elements have shifted and/or have become deformed from one image to the other. Such comparisons of two images are intended notably for the analysis of flexible objects and shapes. In the context of the automatic analysis of pairs of images, that mathematical transformation is computed which transforms the two images one into the other. Such a transformation may also be referred to as a motion and deformation field, since it indicates how every point of the first image has moved in the other image or how a surface element or volume element of the first image has become deformed in the second image. In the case of medical applications, the local distribution of the deformation or motion in an image can be directly visualized so as to support the diagnosis of, for example the growth of a tumor. Furthermore, the deformation may represent the elastic properties of the tissue and hence be used as the basis for cardiac applications, for a comparison of images formed before and after a treatment, and for the compensation of motions of a patient.

Various methods have been proposed for the automatic computation of a motion and deformation field which transforms two different images of the same object one into the other. Many algorithms attempt to establish a correspondence between parting edges (J. Declerck, G. Subsol, J.-P. Thirion, N. Ayache, Automatic retrieval of anatomical structures in 3d medical images, Lecture Notes in Computer Science 950 (1995), p. 153) or boundaries (D. Davatzikos, J. L. Prince, R. N. Bryan, Image Registration Based on Boundary Mapping, IEEE Trans. Medical Imaging 15 (1996), p. 112) that have been extracted in both images. According to these methods, however, only a part of the information contained in the images is used. Therefore, the methods yield transformation parameters only for the lines of the selected characteristics and the transformation must subsequently be expanded to cover the entire volume.

An alternative approach consists in elastic registration that is based on gray values and utilizes the entire image contents. The calculation of a motion and deformation field means that a respective set of transformation parameters must be assigned to each sub-volume of the image (or even to each voxel). The calculation, therefore, is actually an optimization method for determining the field that produces maximum similarity between the images. A motion and deformation field thus represents a very large number of degrees of freedom. Overall optimization schemes for the elastic registration change the overall motion and deformation field in every step of the computation and hence also change a large number of parameters. A large number of local optima is to be expected during these methods and, therefore, in many cases the optimization method becomes stuck in one of the local optima instead of reaching the desired overall optimum.

In another method, that is, the so-called block matching, the image is subdivided into small sections which are separately assigned (P. J. Kostelec, J. B. Weaver, D. M. Healy, Jr., Multiresolution elastic image registration, Med. Phys. 25 (1998), p. 1593). The method, illustrated on the basis of 2D images and proposed for 3D images, commences with a rigid registration of the overall image. Only a shift (translation and rotation of the image) takes place during a rigid transformation, but not a deformation, that is, a location-dependent expansion or compression of lengths. After the rigid registration, the image is successively subdivided into ever smaller sections that are then rigidly assigned again. Each section utilizes the registration parameters found in the "parent block" as initial estimated values for the own registration. Even though this method yields acceptable results for 2D images with comparatively small deformations, in 3D images not even an approximately rigid registration of image sections that are larger than approximately 1 cm is possible in the presence of large deformations. The quality of the initial estimated values, therefore, is very likely inadequate for successful registrations in the last steps of the algorithm where a given overlap is required between small corresponding blocks in the source image and in the target image.

Considering the foregoing it was an object of the present invention to provide a method of computing the transformation between two images of an object that offers a transformation of high accuracy while utilizing only a comparatively small computing capacity, also in the case of strong deformations, and that is less susceptible to becoming stuck in local optima.

This object is achieved by means of a method having the characteristics disclosed in claim 1, by means of a computer program having the characteristics disclosed in claim 9 and by means of a device having the characteristics disclosed in claim 10. Advantageous embodiments are disclosed in the dependent claims.

The method is intended to compute the mathematical transformation that transforms two different images of an object one into the other. The images may notably be medical images which have been acquired, for example by means of an X-ray computed tomography apparatus or by means of a magnetic resonance (MR) tomography apparatus. In this context a transformation between two images is to be understood to mean a function which assigns the points of one image to the points of the other image while leaving the neighbor relations of the points unchanged. Thus, a transformation of this kind is a continuous function which is also referred to as a motion and deformation field, because it describes the motion of the points of the images from one image to the other in relation to the deformation of surface elements or volume elements. The function is preferably objective, so that it assigns each point of one image reversibly unambiguously to a point of the other image.

In conformity with the method first the local transformation parameters are successively computed for sub-regions of the images, and subsequently the entire global transformation is computed from such local transformation parameters. Sub-regions of the image are to be understood to mean coherent surface areas or coherent sub-volumes in the case of three-dimensional images; said surface areas or sub-volumes are usually small in relation to the overall dimensions of the image and preferably are composed of simple geometrical shapes such as rectangles or circles (squares or spheres). Local transformation parameters are the parameters that are necessary to transform a sub-region of a first image into the associated sub-region of the second image.

The method is characterized in that the successive computation of the local transformation parameters for the sub-regions is performed in the following steps:

a) Estimated values are predetermined or computed for the local transformation parameters of at least one first sub-region. This sub-region or these sub-regions serve as a starting point for the following algorithm and it is advantageous when the estimated values are as close as possible to the "true" transformation parameters. Therefore, the estimated values for the first sub-regions are preferably accurately computed while spending the appropriate amount of work, or sub-regions are selected for which the transformation is known with a high accuracy. Local transformation parameters of the sub-region or the sub-regions are computed on the basis of the estimated values.

b) A sub-region is formed or selected from among a predetermined number of sub-regions for which no local transformation parameters have been computed yet and which is preferably situated nearest to an already successively registered sub-region, it being possible to quantify the registration result, for example, by way of the similarity measure found in the context of the optimization. Alternatively, a plurality of such sub-regions can also be formed or selected.

c) For each sub-region formed or selected in step c) the associated local transformation parameters are calculated, the local transformation parameters of sub-regions that have already been successfully registered and that neighbor the sub-region currently being examined, being used as starting values. This means that the sub-region to be computed is first transformed by means of the local transformation parameters of the neighboring sub-regions, after which the transformation thus initialized for this sub-region is optimized by means of further computations.

The steps b) and c) are repeated a number of times until the local transformation parameters have been computed for an adequate distribution of sub-regions. The distribution of the sub-regions describes how the sub-regions are distributed across the surface of the images. Generally speaking, the aim will be to ensure that the distance between an arbitrary point of an image and the nearest sub-region does not exceed a predetermined maximum value; a higher density of sub-regions may make sense in regions of the images that are of particular interest or are situated in particularly strongly moving parts of the images.

Thus, in the method in accordance with the invention the local transformation parameters of sub-regions of the image are computed while propagating from one or a few first sub-regions. The previously determined local transformation parameters of the neighboring sub-regions are used each time as the starting values for the transformation parameters of sub-regions to be registered in a cycle of the method. Thus, in each cycle of the method the information acquired in the preceding cycles is used and passed on. The accuracy level of the local transformation parameters, being predetermined by the starting values, can thus be transferred to the subsequently calculated sub-regions in the cycles of the method, and even be enhanced so that ultimately there will be obtained a number of sub-regions that have been calculated with a high accuracy.

Preferably, the sub-regions on which the method is based are chosen to be sufficiently small, so that the local transformation parameters can be assumed to be constant for all points of the sub-region while maintaining a predetermined accuracy for the relevant transformation. This means that the sub-regions can be transformed one into the other by way of a rigid transformation which can be described each time by six degrees of freedom. Three of these degrees of freedom concern the three-dimensional shift of the center of gravity or another selected point of the sub-region, and the remaining three degrees of freedom relate to a rotation in space of the sub-region around this point. Deformations, that is, location-dependent expansions or compressions of the sub-region, can be ignored without serious loss of accuracy if the sub-region is small enough. The computation of the local transformation parameters of a sub-region can thus be accelerated and stabilized.

Preferably, the method utilizes only sub-regions that exhibit a sufficiently strong, as unambiguous as possible structuring. Structuring is necessary so as to enable a sub-region in a first image to be assigned as unambiguously as possible to the associated sub-region in the second image. There are various possibilities for the quantification of the structuring. Notably the variance of the image values (gray steps, color differences, etc.) in the sub-region can be used as a measure for this purpose.

Furthermore, it has been found that it is beneficial to the accuracy of the method when the sub-regions used are chosen so as to overlap one another at least partly. The stability of the method is thus enhanced notably for large deformations.

In conformity with one version of the method, the sub-regions used can be determined in advance with a suitable distribution in one of the images. In that case a sub-region (or several sub-regions) for which the local transformation parameters are to be calculated next is then selected from each time the predetermined sub-regions in the sub-step b). The determination in advance of the distribution of the sub-regions can notably be performed automatically, the criteria to be used then being a predetermined distribution density (number of sub-regions per unit of surface area) and a predetermined minimum structuring.

When a distribution of sub-regions is chosen in advance, the sub-region selected in the step b) of the method is preferably the sub-region which, from among all sub-regions that have not yet been treated, exhibits the shortest distance from the already successively registered sub-regions. More exactly speaking, all sub-regions that have not yet been treated are weighted with a function. This function includes, for each sub-region neighboring the sub-region to be weighted, the similarity measure achieved during the registration and/or the distance between the center of the already registered sub-region and the sub-region to be weighted. The second selection criterion ensures that the already acquired computation results are locally propagated, that is, across their neighborhood. Such local propagation makes sense, because the local transformation parameters change continuously and hence the already computed local transformation parameters of a sub-region A represent an approximation for the local transformation parameters of another sub-region B which is better as said other sub-region B is situated nearer to the sub-region A, and possibly also as the accuracy of the transformation parameters determined for the sub-region A is higher.

Various possibilities exist as regards the quantification of the distance of a sub-region A from among the number of already registered sub-regions. For example, in the simplest case this distance may be assumed to be equal to the distance between the relevant sub-region A and the nearest already successfully registered sub-region. However, it is also feasible to define the distance value as the mean value (or a function otherwise computed) of all distances in pairs between the relevant sub-region A and the already computed sub-regions. In any case it is important that a new sub-region A to be computed is chosen near already successfully registered sub-regions.

The described principle of distance is preferably used also when the sub-step b) of the method does not utilize predetermined sub-regions, but each time a new sub-region is formed for the further computation instead. This new sub-region should then be formed within an adequate distance from the sub-regions already registered with a high accuracy, thus ensuring that the already known local transformation parameters propagate to the new sub-region with a high accuracy.

In conformity with a further version of the method, the local transformation parameters computed for a sub-region in the step c) are used further only if their accuracy exceeds a predetermined threshold value. Therefore, in the event that a sub-region cannot be assigned to a sub-region of the second image with the desired minimum accuracy, this sub-region will not be taken into account during the further execution of the method. Errors that are due to unsuitable sub-regions can thus be avoided. Unsuitable sub-regions may occur, for example, due to the fact that structures are visible in only one of the images and not visible in the other image.

A particularly suitable measure of the accuracy of the local transformation parameters is the correlation or local correlation between the sub-region in the first image and the contents of the sub-region in the second image that is associated with the local transformation parameters. The contents of the two sub-regions (source and target) are preferably identical, leading to a correlation value amounting to 1.0. Typically, the threshold value beyond which the accuracy of the local transformation parameters is deemed to be adequate is set to a correlation value of approximately 0.6.

In the step c) of the method in accordance with the invention the starting value of the local transformation parameters is determined preferably as a weighted mean value of previously computed local transformation parameters. The sets of local transformation parameters that contribute to this mean value on the one hand are weighted with the distance between the sub-region associated with the transformation parameters and the sub-region to be computed; on the other hand, the accuracy of the transformation parameters determined during preceding registration steps is also taken into account. Such a determination of the starting value of the local transformation parameters takes into account the continuous changing of the local transformation parameters in that local transformation parameters that have already been computed with adequate accuracy are given an effect on the starting value in a sub-region to be newly computed that is greater as the associated sub-region is situated nearer to the sub-region to be computed. The distance-dependent component of the weighting function can be formed, for example by a bell-shaped curve with the sub-region to be computed situated at the center.

In conformity with a further version of the method, the distribution density of sub-regions to be computed is increased in imaging regions in which a low accuracy of the computed local transformation parameters of the sub-regions occurs. This means that in such problematic zones a larger number of sub-regions is computed so as to achieve adequate reliability for the transformation.

Moreover, in order to increase the accuracy of the method in accordance with the invention, the steps a) to d) can be repeated in a number of iterations until a predetermined accuracy of the transformation has been achieved. This means that each iteration cycle consists of the computation of all sub-regions and that this computation of all sub-regions is repeated a number of times until a satisfactory result has been obtained. For a new iteration cycle the first sub-region used in the step a) is selected to be the sub-region which has reached the highest accuracy of the local transformation parameters in the preceding iteration cycle. The highest accuracy achieved in the preceding iteration cycle thus defines the starting point for the next iteration cycle, so that the latter can be expected to achieve an even higher accuracy for all sub-regions. The mathematical transformation computed by means of the method in accordance with the invention is described notably by a continuous, preferably continuously differentiable vector field $y=f(r)$ whose vectors y link corresponding points r, r' of the two images in conformity with the formula $r'=r+f(r)$.

The method can be used notably for medical image processing. Therein, the at least one first sub-region of the step a) of the method is preferably chosen at the area of the reproduction of a bone, for example at the area of the spinal column. Because a bone is not subject to deformation, it is to be expected that a structure defined by bones has changed only due to translation and rotation between the two images. The simplified rigid registration of a first sub-region can thus be expected to be executed with adequate accuracy in such a region. For images that do not contain bones, it is advantageous to choose anatomical landmarks (for example, bifurcations of vessels) as the center of the first sub-region.

The invention also relates to a computer program for computing the transformation that transforms two digitized images of an object, preferably two medical images acquired by means of computed tomography or magnetic resonance tomography, one into the other. The computer program is characterized in that it carries out a computation in conformity with one of the methods described above.

The invention also relates to a data carrier for a computer program on which a computer program of the kind set forth is stored. The data carrier may notably be a magnetic data carrier (disc, magnetic tape, hard disc), an optical data carrier (CD), a semiconductor memory (RAM, ROM . . . ) or the like. The data carrier may notably form part of a computer in which the computer program stored on the data carrier is executed.

Finally, the invention relates to a device for computing the transformation which transforms two digitized images of an object, preferably acquired by means of computed tomography or magnetic resonance tomography, one into the other. The device comprises a central processing unit and at least one memory unit with which the central processing unit is connected and to which it has access for reading and writing of data and commands. The memory unit may especially store the images to be transformed as well as a computer program to be executed by the central processing unit. The memory unit may notably be a magnetic data carrier (disc, magnetic tape, hard disc), an optical data carrier (CD), a semiconductor memory (RAM, ROM . . . ) or the like. The program that is stored in memory and controls the central processing unit is adapted to calculate the transformation on the central processing unit by a method as it was explained above. I.e. the central processing unit executes the successive calculation of the local transformation parameters for the sub-regions with steps a) to d) as explained above. Moreover, the above-mentioned improvements of the method may be implemented in the computer program.

The invention will be described in detail hereinafter, by way of example, with reference to the Figures. Therein:

FIG. 2 shows the propagating computation of sub-regions for two pairs of 3D MR images of the cervical vertebral column;

Figure 1:
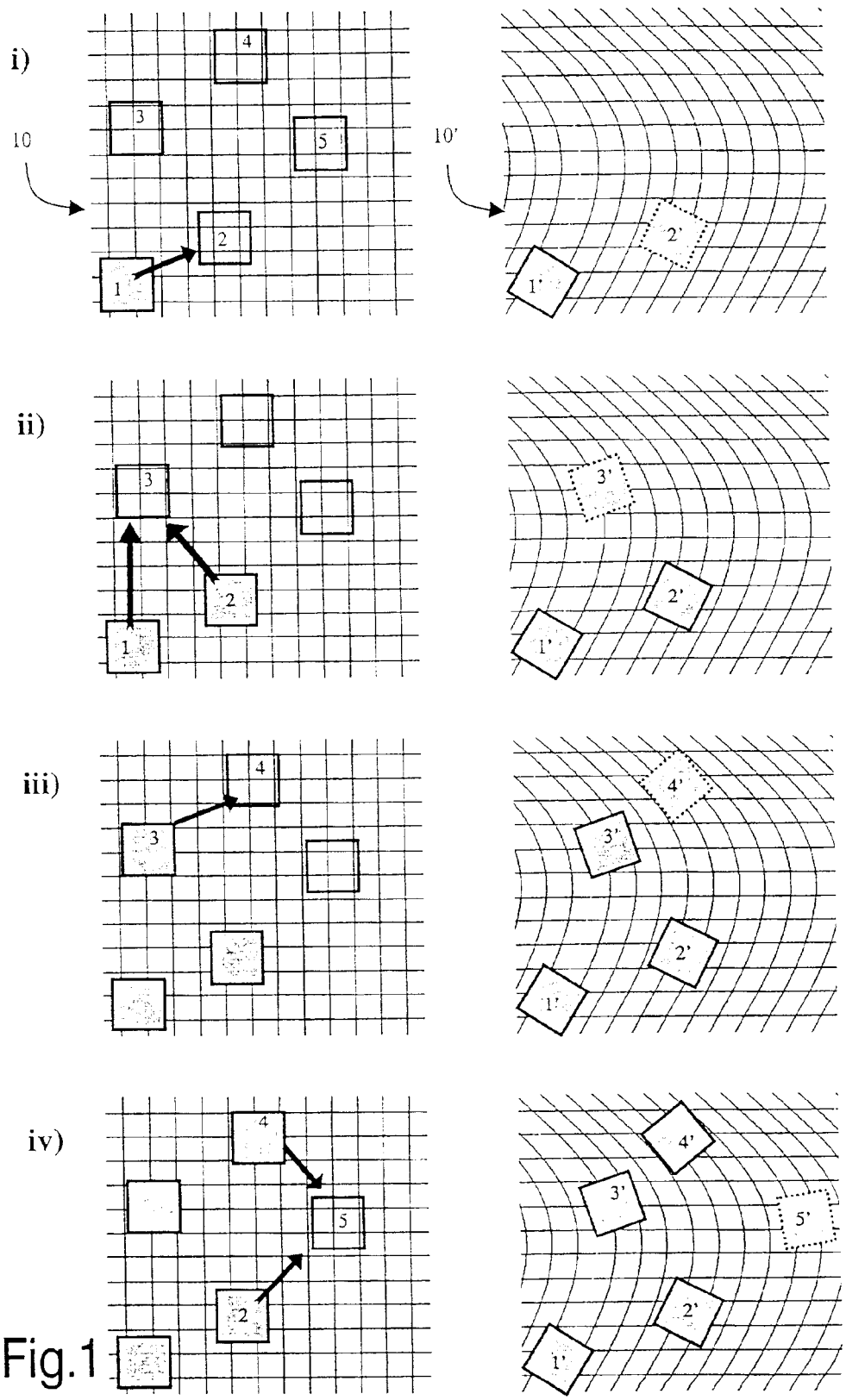
FIG. 1 shows two images 10, 10' which are to be associated by way of a transformation, that is, during four cycles (i)–(iv) of the method in accordance with the invention for computing the local transformation parameters of sub-regions of the images.

FIG. 1 shows diagrammatically the method in accordance with the invention. The method concerns the computation of the transformation between two images 10, 10' which assigns corresponding points of the images to one another. The images should have been acquired from the same object which, however, may have moved or become deformed between the acquisition of the two images. This is symbolized by a continuous deformation of a right-angled grid in the diagram of FIG. 1.

The first image 10 and the second image 10' are shown adjacently on the first line (i) of FIG. 1, five small rectangular sub-regions 1, 2, 3, 4, 5 being shown in the first image 10; these sub-regions are distributed irregularly but with an approximately constant surface density across the image 10. In conformity with the method, first the local transformation parameters of these sub-regions are computed and from these parameters the global transformation can be determined for the overall image 10 during a second step.

The sub-regions should be chosen to be so small that their deformation in the second image 10' can be ignored. The local transformation parameters of a sub-region 1 can, therefore, be described by a rigid transformation with three numerical values (shift in the horizontal and the vertical xy direction as well as an angle of rotation) or by means of six numerical values (translation vector and rotation vector) in the three-dimensional case. Ignoring the deformation becomes manifest graphically in FIG. 1 in that the sub-regions 1', 2', 3', 4', 5' shown in the second images 10' have a rectangular shape whereas in the case of elastic matching they should be shaped as a trapezium having curved sides.

The method in accordance with the invention starts with the computation or preselection of starting values for the local transformation parameters for a selected first sub-region 1 which transform it into the sub-region 1' in the second image 10'. For the computation of the starting values an appropriately large amount of computation work should be done so as to ensure the success of the optimization method and hence an as high as possible accuracy of the result. Preferably, the first sub-region that acts as the starting point is chosen so that the associated local transformation can be estimated as simply as possible or as accurately as possible.

As is indicated by an arrow in FIG. 1(*i*), after the determination of the local transformation parameters for the sub-region 1 on the basis of the starting values, next the local transformation parameters are computed for the sub-region 2 that is situated nearest to the already computed sub-region 1. The starting values for the local transformation parameters of the sub-region 2 are based on the local transformation parameters of the already registered sub-region 1. Because of the nearness of the two sub-regions 1 and 2 and the steady variation of the local transformation parameters, it may be assumed that the selected starting value constitutes a suitable approximation and that the subsequent more accurate computation of the local transformation parameters of the sub-region 2 thus quickly leads to a highly accurate result.

FIG. 1(*ii*) shows the second step of the method. The sub-region 2', computed as explained above, is shown in the second image 10'. Arrows in the first image 10 again indicate that next the local transformation parameters are to be computed for a sub-region 3 which, from among all sub-regions that have not yet been computed, is situated nearest to the already successfully registered sub-regions 1 and 2. The starting values for the local transformation parameters of the sub-region 3 are based on the already computed local transformation parameters of the sub-regions 1 and 2, said parameters preferably being weighted with the distance at which the sub-regions 1 and 2 are situated from the sub-region 3 that is being treated. This means that the sub-region 2 that is situated nearer enters its local transformation parameters with a weight that is higher than that entered by the sub-region 1 that is situated at a greater distance. This is because of the continuous variation of the local transformation parameters. The accuracy of the transformation parameters determined for the sub-regions 1 and 2 is also taken into account for the weighting, so that the sub-region for which the parameters can be determined with a higher accuracy makes a contribution that is comparatively greater.

The right-hand part of FIG. 1(*iii*) shows the result, that is, the sub-region 3' in the second image 10', which sub-region is associated with the sub-region 3 of the first image 10 because of the previously computed local transformation parameters. At the same time arrows in the left-hand part of FIG. 1(*iii*) indicate the further progression of the method. On the basis of the already calculated sub-regions 1, 2 and 3, next the local transformation parameters are computed for the sub-region 4 which is nearest to the already computed sub-regions 1, 2 and 3. Alternatively to the computation of the sub-region 4, the sub-region 5 which is situated at a predetermined distance from the already computed sub-regions could be treated. In the case of similar distances between the sub-regions 3 and 4 or 2 and 5, the decision as to which sub-region is to be treated next is made on the basis of the accuracy achieved for the local transformation parameters of the sub-regions 2 and 3. In the present example, the registration success is assumed to be greater for the sub-region 3 than for the sub-region 2, so that the sub-region 4 is treated next because of its proximity to the sub-region 3.

FIG. 1(*iv*) shows the last step for the intermediate result of the method after all predetermined sub-regions 1, 2, 3, 4, 5 of the first image 10 have been associated with the transformed sub-regions 1', 2', 3', 4', 5' of the second image 10'. As is indicated by the arrows in FIG. 1(*iv*), the local transformation parameters of the sub-regions 2 and 4 are used for the determination of the starting values of the local transformation parameters of the sub-region 5.

Should it be found that the local transformation parameters for a sub-region cannot be computed with the desired accuracy during the execution of the method, this sub-region is preferably precluded from the further processing.

FIG. 2 shows three stages of the propagation of computed sub-regions in 3D MR images of the head-neck region of a human. The three images of the left-hand column concern a first example and the three images of the right-hand side concern a second example of pairs of images. Images resulting from successive steps of the method are arranged one below the other. As proposed by Little at al. (J. A. Little, D. L. G. Hill, D. J. Hawkes, Deformations Incorporating Rigid Structures, Computer Vision and Image Understanding 66, (1997), p. 223), first a rigid assignment of vertebral bodies was carried out before the elastic assignment. The parameters of the vertebra C1 were then used to initialize the starting values of the local transformation parameters for sub-regions in the vicinity of the vertebral column. Sub-regions in the MR images are denoted by small squares. These squares are oriented so that their sides extend vertically and horizontally in the respective left-hand images, whereas in the right-hand image they are shown to be shifted and rotated because of the motion or deformation of the object. Because in a first approximation a rigid registration of the sub-regions is performed, the magnitude of corresponding sub-regions in the left-hand image and the right-hand image always is still the same.

Sub-regions that are situated further from C1 are assigned in successive steps of the method until all sub-regions of a desired distribution have been assigned (registered). The larger the elastic deformation in the images, the larger the local variations of the transformation parameters will be. Experiments have shown that the choice of overlapping sub-regions (sub-volumes) can enhance the stability of the method in respect of large deformations. When the deformations are smaller than the examples shown in FIG. 2, a smaller number of sub-regions also suffices to achieve a comparable accuracy.

Even though the conventional cross-correlation can be used for applications of a single modality, it has been found that the local correlation similarity measure (J. Weese, P. R ösch, T. Netsch, T. Blaffert, M. Quist, Gray-Value Based Registration of CT and MR Images by Maximization of Local Correlation, Springer Lecture Notes on Computer Science 1679 (1999) p. 656) is particularly suitable for the registration of small volumes. The results that are shown in the FIGS. 2 and 3 have been obtained by means of an algorithm for the automatic selection of sub-regions on the basis of local variance. Even when a simple gradient optimization method was used, the average time required for the registration of a sub-region amounted to only approximately one half second (computer: Sun Ultra Sparc, 400 MHz). The capability of the algorithm can be enhanced substantially still by optimization methods adapted to this application.

The local correlation also makes it possible to classify the sub-regions in respect of the quality of the sub-region itself (by way of its local variance contents) as well as in respect of the result of the registration method (by way of the value of the mean local correlation coefficient after the registration).

Figure 3:
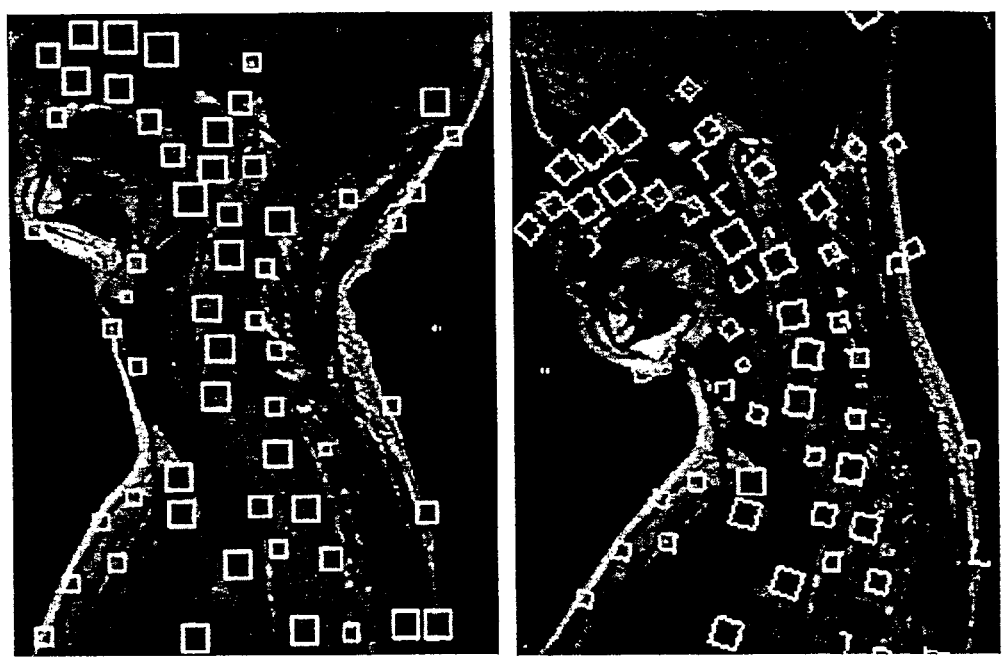
FIG. 3 shows two 3D MR images of the cervical vertebral column with associated sub-regions indicated therein.

FIG. 3 shows two 3D MR images of the head-neck zone with strong elastic deformation. Sub-regions (being volumes in this case) have been selected in the left-hand image and the associated sub-regions in the right-hand image were determined by means of the method in accordance with the invention. The sub-regions shown have been chosen in conformity with the accuracy of the registration, the mean local correlation coefficient being larger than 0.6. Due to an axial rotation of the head, not all sub-regions of the left-hand image are visible in the right-hand image. Only a part of the sub-regions used for the registration is shown. As can be seen from FIG. 3, the magnitude of part of the corresponding sub-regions has not changed, because the registration has been computed in conformity with a rigid transformation.

In comparison with the algorithms that are known from the state of the art for computing a motion transformation, the method of the present invention offers the following advantages:

No elaborate preparation is required for the extraction of characteristics such as, for example, parting edges.

The algorithm is more robust in respect of local optima than customary optimization approaches.

In the case of large deformations, starting values have to be prepared for a small part of the image only, and the algorithm recognizes the starting values for the remainder of the image by the propagation of sub-regions.

A quantitative local measure of the success of the registration process is obtained. Areas of the image that have a low registration accuracy, therefore, can be automatically identified. This is essential for the implementation of an algorithm which iteratively enhances the accuracy of the result.

The parameter space to be searched for the sub-region registration is substantially reduced because of the small variability of the transformation parameters between neighboring sub-regions.

The effectiveness of the method in the presence of large deformations could be demonstrated for a number of examples.

Various alternative and extended versions are feasible for the algorithm that has been described by way of example. For example, in an iterative approach the estimated local distribution of the registration accuracy can be used so as to identify those image regions in which the method has produced accurate registration results. On the basis of these regions it is possible to propagate sub-regions into the remaining parts of the image in order to enhance the overall accuracy of the deformation field. This process can be repeated until the desired accuracy has been obtained for the entire volume.

Furthermore, the algorithm can be applied to a multi-scale representation of high-resolution images (for example, cone beam CT) in order to classify the deformations in respect of their location and to reduce the time required for computation. The multi-scale representation involves the formation of a plurality of resolutions of an image, that is, generally by smoothing. In accordance with the method local transformation parameters would be determined with a coarse resolution and the result would be refined continuously by way of increasingly higher resolutions. Because interactive applications are particularly critical in respect of time, in such cases a region of interest could be specified by way of a user interface. The method in accordance with the invention could then be applied in such a manner that it is limited to the region of interest, for example, to specific vessels.

What is claimed is:

1. A method of computing the transformation which transforms two images (10, 10') of an object, preferably acquired by means of computed tomography or magnetic resonance tomography, one into the other, first the local transformation parameters being successively computed for sub-regions (1, 2, 3, 4, 5) of the images and subsequently the overall transformation being computed therefrom, the method of performing successive computation of the local transformation parameters for the sub-regions comprising:

a) predetermining or computing the local transformation parameters for at least one first sub-region (1) by way of a rigid transformation, the at least one first sub-region including one of a coherent surface area and a coherent sub-volume;

b) forming or selecting at least one sub-region (2) that has not yet been computed from among a quantity of other predetermined sub-regions (2, 3, 4, 5), each of the other predetermined sub-regions including one of a coherent surface area and a coherent sub-volume;

c) for each sub-region (2) in the step b), calculating the local transformation parameters by way of a rigid transformation, wherein the local transformation parameters of at least one neighboring sub-region (1) that has already been successfully treated are used as starting values in calculating the local transformation parameters for a respective sub-region (2) in step b); and d) repeating the steps b) and c) a number of times until the local transformation parameters have been computed for an adequate distribution of sub-regions across the images.

2. A method as claimed in claim 1, wherein the sub-regions (1, 2, 3, 4, 5) are chosen so as to be sufficiently small so that the local transformation parameters may be assumed to be constant for all points of the respective sub-region while maintaining a predetermined accuracy.

3. A method as claimed in claim 1, wherein sub-regions (1, 2, 3, 4, 5) that contain adequately strong structuring are used exclusively.

4. A method as claimed in claim 1, wherein neighboring sub-regions are chosen so as to overlap at least partly.

5. A method as claimed in claim 1, wherein prior to step a), a suitable distribution of sub-regions (1, 2, 3,4, 5) is determined in one of the images (10), and in step b), at least one sub-region (2) that has not yet been computed is selected from said distribution.

6. A method as claimed in claim 5, wherein the sub-region (2) that is selected in the step b) is the sub-region that has the highest weighting factor from among all sub-regions (2, 3, 4, 5) that have not yet been computed, a high weight being induced by a small distance from one or more selected from the group consisting of i) an already registered sub-region and ii) a high accuracy of the transformation parameters determined for the already registered sub-region.

7. A method as claimed in claim 1, wherein the local transformation parameters computed for a sub-region (2) are used further exclusively if their accuracy exceeds a specified threshold value.

8. A method as claimed in claim 1, wherein during step c), the starting value of each of the local transformation parameters is determined as a mean value of the already computed local transformation parameters that is weighted with one or more selected from the group consisting of i) the distance of the associated sub-regions (1) and ii) registration accuracy of the associated sub-regions (1).

9. A computer program stored on a computer readable media, the computer program comprising instructions for computing a transformation which transforms two digitized images (10, 10') of an object, preferably acquired by means of computed tomography or magnetic resonance tomography, one into the other, wherein the computation is performed by means of a method as claimed in claim 1.

10. A device for computing the transformation which transforms two digitized images (10, 10') of an object, preferably acquired by means of computed tomography or magnetic resonance tomography, one into the other, comprising a central processing unit that is connected to at feast one memory unit for the images and for a computer program executable by the central processing unit, the program being adapted to control the calculation of the transformation according to a method as claimed in claim 1.

* * * * *